Patented Feb. 26, 1929.

1,703,732

UNITED STATES PATENT OFFICE.

HANS HAHL, OF ELBERFELD, GERMANY, ASSIGNOR TO WINTHROP CHEMICAL COMPANY, INC., OF NEW YORK, N. Y., A CORPORATION OF NEW YORK.

COMPLEX ANTIMONY COMPOUNDS AND PROCESS OF MAKING SAME.

No Drawing. Original application filed February 10, 1927, Serial No. 167,365, and in Germany April 22, 1926. Divided and this application filed November 28, 1927. Serial No. 236,380.

The present invention is a further development of my U. S. Patents Nos. 1,628,838 and 1,688,964 which protect the manufacture of complex antimony compounds. The process therein described consists in causing interaction of the antimonyl compounds of such polyphenols as contain two hydroxyl groups in the ortho-position to one another, or of their substitution products with the neutral salts of such carboxylic acids as contain in the molecule hydrogen atoms which migrate easily on account of the proximity of acid groups, or alternatively with the neutral salts of aliphatic hydroxy acids.

As a result of further investigation, it has now been ascertained that instead of the neutral salts of the above carboxylic acids containing hydrogen atoms, which can easily migrate or instead of aliphatic hydroxy acids there can be employed the neutral salts of sulfonic acids of such polyphenols as contain two hydroxyl groups in the ortho-position to each other, as for example, pyrocatechin disulfonic acid, 2.3-dioxynaphthalene sulfonic acids and the like.

The new compounds are solid substances which are easily soluble in water and the aqueous solutions of which do not exert any irritant action and can be sterilized at 100° C. Mineral acids first cause precipitation, dissolving in excess of acid. The new compounds are excellent trypanocides.

This is a division of my co-pending application Ser. No. 167,365 filed on February 10, 1927.

The following example serves to illustrate my invention:

Example:—20 parts by weight of pyrocatechin disulfonic acid are dissolved with 250 parts of water and 3.5 parts by weight of caustic soda to a clear neutral solution. After the addition of 20 parts by weight of antimonyl pyrocatechin heating takes place for some time and after filtration from any insoluble matter the solution is poured into alcohol, when the new complex antimony compound having most probably the formula:

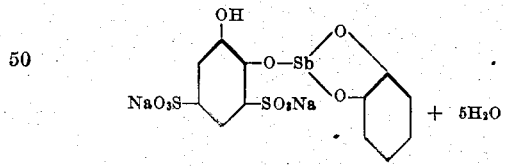

is precipitated in the form of the sodium salt. After filtration and drying it represents a slightly colored powder, which is easily soluble in water and has an antimony content of approximately 17 to 18 per cent.

I claim:

1. In the process for the manufacture of complex antimony compounds the step comprising the interaction of an antimonyl compound of such a polyphenol as contains two hydroxyl groups in ortho-position to each other with a neutral alkali metal salt of a sulfonic acid of such a polyphenol as contains two hydroxyl groups in ortho-position to each other.

2. The new complex antimony compounds being derived from a sulfonic acid of such a polyphenol as contains two hydroxyl groups in ortho-position to each other and an antimonyl compound of such a polyphenol as contains two hydroxyl groups in ortho-position to each other being generally in the form of their alkali metal salts, colorless or slightly colored solid substances easily soluble in water the neutral aqueous solutions of which possess no irritant effect and can be sterilized at 100° C. and are precipitated by a mineral acid, possessing outstanding specific acting properties and being intended to find application in therapy as new trypanocides.

3. The new complex antimony compound being derived from pyrocatechin disulfonic acid and antimonyl pyrocatechin having in the form of its sodium salt most probably the formula:

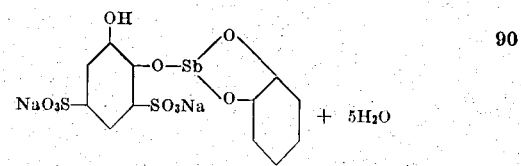

which sodium salt forms a powder which dissolves in water giving an almost neutral reaction, the aqueous solution possesses good stability and is precipitated by alkaline sulfides the new product being a valuable trypanocide.

In testimony whereof I have hereunto set my hand.

HANS HAHL.